Jan. 26, 1954
A. V. RAUGHT
2,667,286
SPLIT SEED WHEEL FOR PLANTERS
Filed Aug. 29, 1950
2 Sheets-Sheet 2
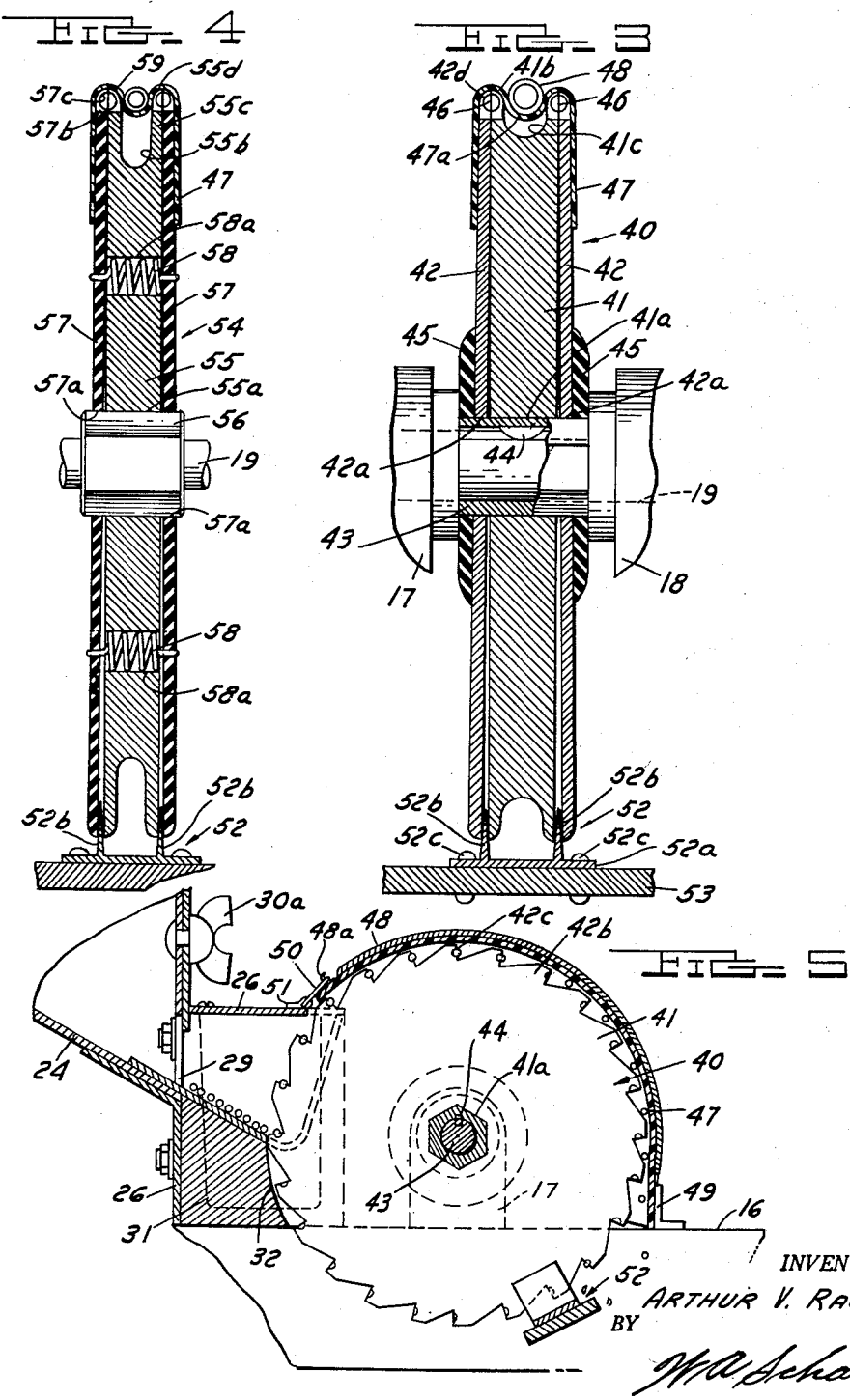
INVENTOR.
ARTHUR V. RAUGHT
BY
ATTORNEY Patented Jan. 26, 1954

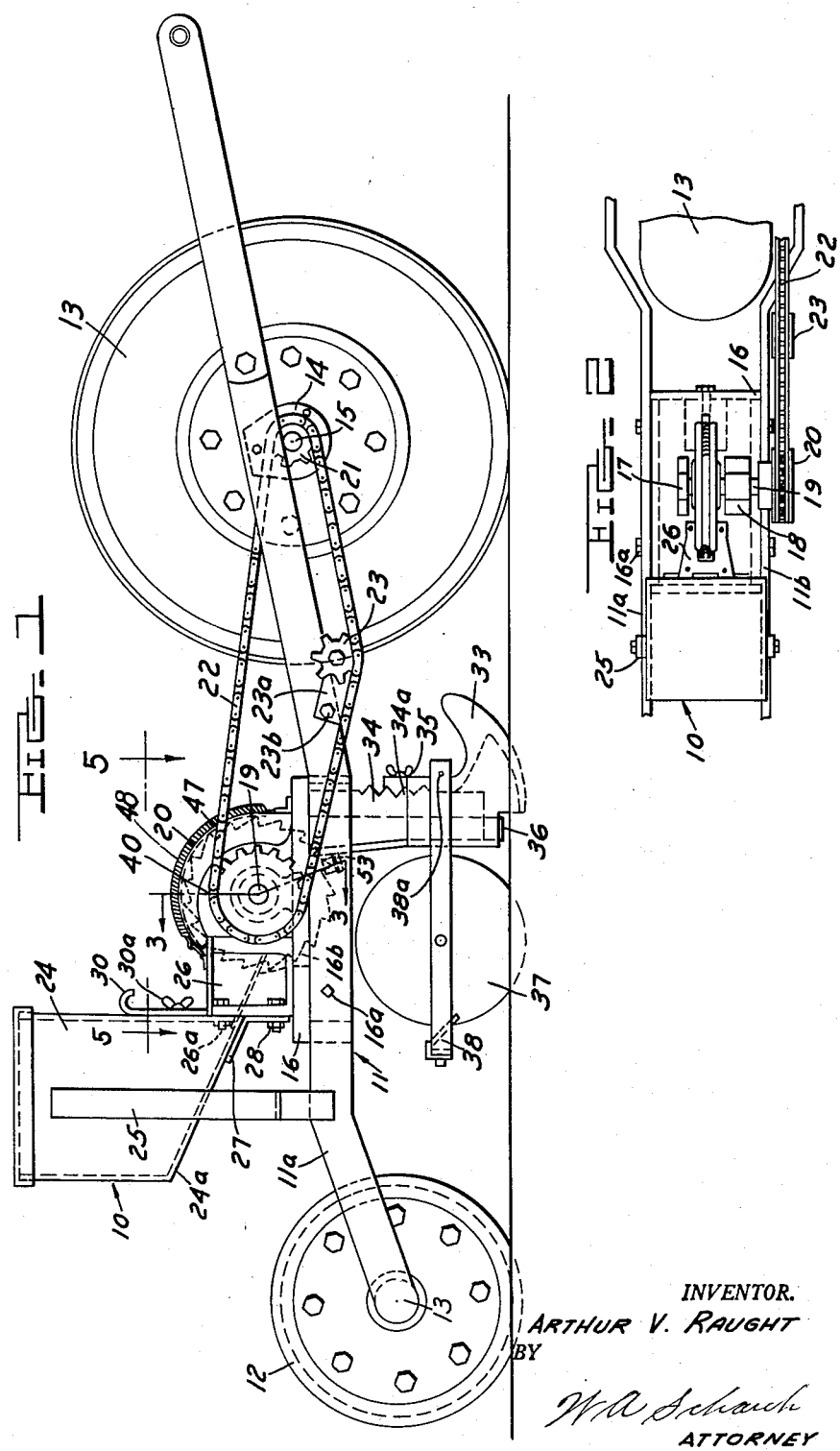

2,667,286

UNITED STATES PATENT OFFICE 2,667,286

SPLIT SEED WHEEL FOR PLANTERS

Arthur V. Raught, Birmingham, Mich., assignor to Dearborn Motors Corporation, Highland Park, Mich., a corporation of Delaware Application August 29, 1950, Serial No. 182,042

8 Claims. (Cl. 222—9)

This invention relates to an improvement in planting machines and more particularly to an improved seed selecting wheel for precision seed planting machines.

Certain types of farming notably truck or garden farming, require the extensive use of hand labor in thinning and cultivation of the crops. Obviously such use of hand labor is expensive and in an effort to reduce some of this cost, considerable attention has been directed to the precision planting of the seed in an effort to eliminate the necessity for thinning the subsequent plant growth. One of the precision planting machines that has been developed utilizes a rotating seed wheel having a plurality of peripherally disposed seed pockets and such seed wheel revolves within a seed hopper so that the seed pockets may readily pick up a seed in each pocket as such wheel revolves. Seed preferably utilized with this type of seeder is of the pelletized type, thereby insuring uniformity in grain size so that only one individual seed will be selected by each pocket.

While a machine as above described has planted pelletized seed with an accuracy of spacing heretofore believed impossible, one serious deficiency with this type of machine has come to light, however, which adversely affects the plant stand. This deficiency resides in the tendency of pelletized seed to stick in the seed pocket or cell and obviously when this happens there will be no seed picked up by the obstructed seed pockets or cells. Thus a fewer number of seeds will be planted per revolution of the seed wheel, and where large acreages are involved, it is readily apparent that the reduced number of seeds planted would involve huge quantities of plants which represents a considerable economic loss to the farmer.

Accordingly, it is an object of this invention to provide an improved seed selecting wheel arrangement for a planting machine which will substantially eliminate any skipping of seeds planted resulting from failure of seeds to dislodge from the seed cells of the seed wheel.

Another object of this invention is to provide an improved seed wheel for a planting machine which is of simple design which will not bruise the seed and yet which will substantially eliminate any tendency of seeds to remain in the seed wheel.

The specific nature of this invention, as well as other objects and advantages thereof, will become apparent to those skilled in the art from the following detailed description, taken in conjunction with the attached sheets of drawings on which, by way of preferred example only, is illustrated two embodiments of this invention.

On the drawings:

Fig. 1 is a side elevational view of a precision seed planter embodying the improved seed wheel of this invention.

Fig. 2 is a partial plan view of Fig. 1.

Fig. 3 is an enlarged detailed cross sectional view taken along the plane 3—3 of Fig. 1.

Fig. 4 is a view similar to Fig. 3 but showing a modification of the improved seed wheel.

Fig. 5 is an enlarged longitudinal sectional view taken substantially along the plane 5—5 of Fig. 1.

As shown on the drawings:

In Fig. 1 there is shown in assembled relation a seed planter 10 of the general type described and claimed in the co-pending application of Herman Wechsler Serial No. 124,018 filed October 28, 1949 and assigned to the assignee of this application. Seed planter 10 comprises a frame 11 formed by two spaced apart longitudinal members 11a and 11b. The rear ends of frame members 11a and 11b slope downwardly as shown in Fig. 1 and a packing wheel 12 is rotatably mounted on a shaft 13 transversely supported by the ends of frame members 11a and 11b. The forward ends of frame members 11a and 11b may be pivotally connected to a tractor drawbar (not shown).

A ground engaging wheel 13, preferably rubber tired, is rotatably supported by the members 11a and 11b of frame 10 on an upwardly sloping front portion thereof. Depending brackets 14 respectively provided on frames 11a and 11b transversely support an axle 15 of wheel 13. A channel shaped base plate 16 is secured by a plurality of bolts 16a to frame 11, intermediate packing wheel 12 and the ground engaging wheel 13. A rectangular aperture 16b is provided in plate 16 substantially in the center thereof for a purpose to later appear. A pair of transversely spaced bearings 17 and 18 are bolted to the top of base plate 16 in transversely spaced relation and such bearings rotatably support a transversely disposed shaft 19. Shaft 19 projects outwardly beyond bearing 18 and a sprocket 20 is secured to such end of shaft 19. A second sprocket 21 provided on axle 15 of ground engaging wheel 13 is aligned with sprocket 20 so that a chain 22 may be connected about sprockets 20 and 21 whereby ground wheel 13 can drive sprocket 20 for a purpose to be later described. An idler sprocket 23 rotatably mounted on a bracket 23a secured to frame member 11a by a bolt 23b is provided for tensioning chain 22.

A seed hopper 24 comprising a sheet metal box provided with a sloped bottom 24a is vertically supported on frame 11 by a vertically disposed bracket 25 suitably secured to frame 11. The forward face of hopper 24 is secured to a boxlike seed discharge spout 26 bolted or otherwise secured to base plate 16. Hopper 24 is secured to spout 26 by a pair of bolts 26a and a supporting angle 27 is provided underneath hopper 24, such angle being secured to spout 26 by a bolt 28. A forwardly facing aperture 29 is provided near the bottom of hopper 24 which communicates with spout 26 to permit seed contained in hopper 24 to flow into spout 26. A gate 30 is provided for controlling the flow of seed in the seed spout 26, such gate comprising a thin sheet of metal slotted to receive a wing nut and bolt 30a which cooperate with such slot and the side of the hopper to secure gate 30 at any desired position of vertical adjustment. A spacer 31 is vertically disposed and integrally formed with the base portion of seed discharge spout or box 26 and such spacer projects between two seed selecting peripheries of a seed wheel 40 which is mounted on shaft 19 and which will be later described. On each side of spacer 31 there is provided an arcuate slot as shown at 32 in Fig. 5 to admit one of the seed selecting peripheral portions of seed wheel 40 and such slots conform to the radius of wheel 40 to prevent seed from falling out of the bottom of spout 26 as such wheel is in substantially intimate contact with arcuate slots 32.

A boot 33 of well known construction surrounds a depending tubular boot support 34 for opening a furrow for the reception of seed deposited by the planter. Tubular support 34 fits within a suitable aperture provided within plate 16 and is so positioned that the forward edge of seed wheel 40 is substantially aligned with the vertical axis of tubular support 34, as best shown in Fig. 1. A plurality of transversely disposed teeth 34a are provided on the front face of tubular support 34 which are engageable by corresponding teeth on boot 33 whereby such boot may be secured by a wing bolt and wing nut 35 in any desired vertical position of adjustment within the limits provided. A seed receiving and conveying tube 36 is secured within tubular support 34 for the reception of seeds from seed wheel 40 as will be later described. A covering disc 37 is rotatably supported in a frame 38 pivotally secured to boot 33 by a pin 38a.

Seed wheel 40 performs the same function as does the seed wheel described in the aforementioned Wechsler patent application, however, in this instance seed wheel 40 is so constructed as to automatically remove any seeds lodged in any of the seed cells. Seed wheel 40 comprises a main disc-like body portion 41 and a pair of outer disc portions or side plates 42 are placed against the opposite faces of body portion 41. The body portion 41 is provided with an axial hexagonally shaped aperture 41a and each of the outer disc portions 42 are provided with an axial aperture 42a whereby such discs may be mounted on a hexagonal adapter member 43. Adapter member 43 is rotatably mounted on shaft 19 intermediate the two bearings 17 and 18 so that seed wheel 40 will be rotatably mounted on base plate 16. Adapter 43 is secured to shaft 19 by a key 44 which cooperates with suitable splines in adapter 43 and shaft 19 as shown in Fig. 3. The periphery of seed wheel 40 projects through rectangular slot 16b and also projects into seed spout 26 through arcuate slot 32 as was previously mentioned. A pair of relatively large rubber washers 45 are mounted on adapter 43 in contact with the outer sides of discs 42 and such washers respectively abut the adjacent hubs of bearings 17 and 18 to yieldingly maintain side plates 42 in contact with disc 41 for a purpose to be later explained.

Side plates 42 when assembled adjacent the sides of main disc 41 define semi-spherical seed receiving cells or pockets 46 as will now be described. A plurality of saw tooth like projections 42b are provided about the periphery of each side plate 42 and such projections are equally angularly spaced about the periphery of such discs. Each projection or lug 42b has a forwardly facing radial face 42c in which there is formed a partial spherical recess 42b. The main disc 41 is provided on each end face with a plurality of corresponding saw tooth like projections 41b and each of such projections has a corresponding radial face and a corresponding partial spherical socket therein which, when aligned with the socket 42d defines the generally semi-spherical seed cell 46 as best shown in Fig. 3. It is here pointed out that seed cells so defined on each side of the seed wheel 40 may be disposed in staggered relationship as was fully described in the aforementioned co-pending patent application.

Seed cells 46 revolve within seed box or spout 26 in timed relation to the ground speed of the planter unit, each cell selecting a seed therefrom and carrying it through approximately one half a revolution of the seed wheel 40 as best shown in Fig. 5. To prevent the seed from being lost from the seed cell during the half revolution of seed wheel 40, a transparent plastic cover 47 surrounds the exposed portion of wheel 40 as best shown in Fig. 5. Cover 47 extends down along the sides of discs 42 as best shown in Fig. 3 while the peripheral portion of cover 47 is deformed or curved downwardly as shown at 47a to fit within an annular groove 41c provided about the periphery of disc 41. Spacer 31 cooperates with such groove to prevent the dropping of seed through the plate 16. A helical spring 48 is placed within the deformed portion of the cover and the lower end of such spring is attached to an angle bracket 49 welded or otherwise secured to base plate 16. The other end of spring 48 is provided with a hook 48a engageable with a U-shaped link 50, such link is pivotally mounted on a bracket 51 secured by welding to the top of seed box or spout 26. Thus spring 48 secures cover 47 about the exposed portion of seed wheel 40 to retain seeds within the cells 46 until the moment of discharge as shown in Fig. 5.

To remove any seeds which stick in the seed cells 46, a cell splitting device 52 is provided. Such device comprises a pair of vertical transversely spaced knife blade members 52b secured by welding to a base portion 52a.

Base portion 52a of seed splitting device 52 is secured by rivets 52c to a transverse bar like support 53 which is secured as by welding between the vertical flanges of base plate 16 as shown in Fig. 1. Support 53 is positioned relative to base plate 16 so that the knife blade portions 52b of seed splitting device 52 respectively project upwardly between the outer discs 42 and the inner disc 41 of split seed wheel 40 to thereby separate the outer disc 42 from main disc 41 as best shown in Fig. 3. The resilient rubber washers 45 maintain the upper half of outer discs 42 in substantially intimate contact with the side surfaces of main disc 41 so that the seed cells 46 in the upper peripheral portions of discs 42 and 41 will not be separated. Hence as seed wheels 40 revolve through seed box or spout 26, the seed cells 46 will therefore still be able to select an individual seed and carry such seed about a partial revolution of such seed wheel underneath transparent cover 47 to deposit the seed at the mouth of seed tube 36 for discharging into the furrow formed by seed boot 33.

As knife blades 52b project upwardly between the outer discs 42 and the main disc 41, the cells in the lower peripheral portions of seed wheel 40 are in effect successively split open by the knife blades 52b and in the event that any seed remains or sticks in any seed cell 46 when such cell reaches the corresponding knife blades 52b, the seed contained therein will be forcibly ejected from the cell. Hence knife blades 52b readily clear any seeds that fail to drop out of any of the seed cells 46 in the normal manner.

A modified construction of the seed wheel is illustrated in Fig. 4. In such figure there is shown a seed wheel 54 which comprises a main disc like portion 55 having an axial hexagonally shaped bore 55a in which is press fitted a hexagonal adapter 56. Adapter 56 with the main body portion 55 thereon is press fitted on shaft 19 between bearings 17 and 18 for mounting therebetween as previously described for seed wheel 40. Disc portion 55 is provided with an annular groove 55b centrally disposed about the periphery thereof and a plurality of saw tooth like projections 55c are provided about each peripheral edge of disc 55 similar to the projections provided on disc 41 of split seed wheel 40. In each of the projections 55 there is provided a partial spherical socket 55d which forms one half of a semispherical seed cell 59.

A pair of relatively thin section disc like side plates 57 each having an axial hexagonally shaped aperture 56a are press fitted on hexagonal adapter 56 on opposite sides of disc 55 as shown in Fig. 4. Side plates 57 are constructed of a stiff yet resilient material, of a rubber or plastic composition and such plates are secured or held against the outside surfaces of disc 55 by a plurality of helical springs 58. Springs 58 are inserted in suitable transverse holes 58a provided in disc 55. The ends of springs 58 are respectively secured in suitable fashion to plates 57 to yieldingly secure the outer plates 57 in abutment with an end face of disc 55. Each plate 57 is provided with a plurality of saw tooth projections 57b which correspond to the projections 55b of disc 55 and in each of the projections 57b there is provided a partial spherical socket 57c which when aligned with socket 55b, defines the semispherical seed cell 59 which corresponds to seed cell 46 of seed wheel 40. The same seed splitting device 52 is utilized to separate plate 57 from disc 55 near the bottom peripheral portion thereof in the same manner as described for seed wheel 40, hence no further description of such seed splitting device is believed necessary.

With this modification the necessity for rubber washers 45 is eliminated, thereby somewhat simplifying the manufacture of seed wheel 54. Seed pockets 57c may be readily formed in the molding of discs 57. Discs 57 being constructed of resilient material will readily yield to open up as such discs are split apart by knife blades 52b as shown in Fig. 4 to permit the stuck seed in any cell 59 to be forced out of such cell.

From the foregoing description it is clearly apparent that there is here provided an improved seed wheel for precision planters. Such device readily effects the removal of any seeds stuck in the seed cells without affecting the seed selecting efficiency of the wheel, which insures that all of the seed cells in the seed wheel will be cleared and ready for the reception of a new seed as the wheel revolves through the seed discharge box, with but a negligible variation in the planting rate of the seeder.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a planting machine having a seed hopper, a seed selecting wheel disposed with a portion of its periphery movable through the hopper, said wheel comprising a rotatable body portion, a disc like side plate, means yieldingly securing said side plate against the radial face of said body portion, said body portion and said side plate having alignable peripheral recesses in their abutting surfaces defining seed cells when aligned, and means for separating a peripheral portion of said side plate from said body portion at a location remote from said hopper for dislodgement of a seed retained in said seed cell.

2. In a planting machine having a frame and a seed hopper mounted on the frame having a discharge opening, the improvement comprising a two piece, radially split seed wheel revolvably mounted on the frame adjacent the discharge opening with a portion of its periphery passing through said discharge opening, said split seed wheel having a plurality of peripherally spaced seed pockets bisected by the radial split of said seed wheel, and means for separating the two pieces of said split wheel below the axis thereof for removing seeds lodged in said seed pockets.

3. In a planting machine having a frame and a seed hopper mounted on the frame having a discharge opening, the improvement comprising a two piece, radially split seed wheel revolvably mounted on the frame adjacent the discharge opening with a portion of its periphery passing through said discharge opening, said split seed wheel having a plurality of peripherally spaced seed pockets bisected by the radial split of said seed wheel, means enclosing substantially all of said seed pockets above the axis of said seed wheel for retaining seeds in said pockets, and means for separating the two pieces of said split wheel below the axis thereof for removing seeds lodged in said seed pockets.

4. The combination defined in claim 2 wherein said last mentioned means comprises a stationary blade member, said blade member being constructed and arranged to project between the two pieces of said seed wheel to displace said pieces and intersect said peripheral seed pockets as said seed wheel revolves.

5. In a planting machine having a frame and a seed hopper mounted on the frame having a discharge opening, the improvement comprising a two-piece, radially split seed wheel revolvably mounted on the frame adjacent the discharge opening with a portion of its periphery passing through said discharge opening, each of said seed wheel pieces comprising a disc-shaped element, resilient means yieldingly maintaining said discs in radial face abutment, each of said discs having radially spaced, aligned peripheral recesses defining a portion of a seed receiving pocket in their abutting radial face, and a stationary blade member constructed and arranged to project between and displace said discs at a point remote from said hopper and intersect said seed pockets as said seed wheel revolves, whereby a seed lodged in said pockets is removed.

6. The combination defined in claim 5 wherein said resilient means comprises an axially disposed rigid fastener traversing said discs and a resilient washer compressed between said fastener and one of said discs.

7. For use with a planting machine having a seed hopper, a seed selecting wheel disposed with a portion of its periphery movable through the hopper, said wheel comprising a rotatable body portion, a pair of disc-like side plates, means respectively yieldingly securing said side plates against the opposite radial faces of said body portion, said body portion and said side plates having alignable peripheral recesses in their abutting surfaces defining seed cells when aligned, and means for separating a peripheral portion of each of said side plates from said body portion at a location remote from said hopper for dislodgement of a seed retained in said seed cell.

8. For use with a planting machine having a seed hopper, a seed selecting wheel disposed with a portion of its periphery movable through the hopper, said wheel comprising a rotatable body portion, a flexible disc like side plate, means securing said flexible side plate against the radial face of said body portion, said body portion and said flexible side plate having alignable peripheral recesses in their abutting surfaces defining seed cells when aligned, and means for separating a peripheral portion of said flexible side plate from said body portion at a location remote from said hopper for dislodgement of a seed retained in said seed cell.

ARTHUR V. RAUGHT.

References Cited in the file of this patent

UNITED STATES PATENTS

| Number | Name | Date |
|--------|------|------|
| 200,286 | Harbin | Feb. 12, 1878 |
| 1,142,515 | Good | June 8, 1915 |
| 1,997,791 | Hoberg et al. | Apr. 16, 1935 |
| 2,440,846 | Cannon | May 4, 1948 |
| 2,475,381 | Erickson | July 5, 1949 |